US006210024B1

(12) United States Patent
Shida

(10) Patent No.: US 6,210,024 B1
(45) Date of Patent: Apr. 3, 2001

(54) VEHICLE LAMP

(75) Inventor: Hiroshi Shida, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/165,288

(22) Filed: Oct. 2, 1998

(30) Foreign Application Priority Data

Oct. 3, 1997 (JP) ..................................................... 9-270959

(51) Int. Cl.[7] ................................ F21V 7/20; F21V 7/00; B60Q 1/00

(52) U.S. Cl. .......................... 362/345; 362/342; 362/507; 362/547

(58) Field of Search .................................... 362/507, 345, 362/342, 547; 313/33

(56) References Cited

U.S. PATENT DOCUMENTS

| | | | | |
|---|---|---|---|---|
| 3,388,249 | * | 6/1968 | Siegel et al. | 362/345 |
| 4,857,794 | | 8/1989 | Watanabe | 313/113 |
| 4,895,693 | | 1/1990 | Suzuki et al. | 362/61 |
| 4,930,054 | * | 5/1990 | Krebs | 362/149 |
| 4,985,815 | * | 1/1991 | Endo | 362/345 |
| 5,119,276 | | 6/1992 | Suzuki | 362/61 |
| 5,183,328 | * | 2/1993 | Osteen | 362/345 |

* cited by examiner

*Primary Examiner*—Cassandra Spyrou
*Assistant Examiner*—Jennifer Winstedt
(74) *Attorney, Agent, or Firm*—Sughrue, Mion, Zinn, Macpeak & Seas, PLLC

(57) ABSTRACT

A vehicle lamp such that a bulb structurally integrating a bulb body with a plastic bulb socket is fixed and held in a bulb fitting hole in the rear top portion of a container-like metal reflector in a lamp chamber by a plastic socket fixture. In the vehicle lamp, the reflector is provided with convection-current forming holes and an air convention current generated between the inside and outside of the reflector promotes the heat radiating action of the reflector via the convection-current forming holes. Furthermore, a decrease in the light receiving area of the reflector to an extent equivalent to an area corresponding to the convection-current forming holes reduces heat deriving from direct and radiant heat transmitted to the reflector to that extent. Thus, the reflector is restrained from being heated to high temperatures.

10 Claims, 6 Drawing Sheets

VEHICLE LAMP

BACKGROUND OF THE INVENTION

1. Field of the Invention

The present invention relates to a vehicle lamp wherein a light source is fitted into a light-source fitting hole formed in a metal reflector disposed within a lamp chamber. More particularly, the invention relates to a vehicle lamp wherein a light source is fixed, by a plastic fixedly holding means, in the light-source fitting hole formed in a metal reflector.

2. Related Art

As shown in FIG. 7, a projection-type automobile headlamp as an example of the conventional lighting fixture of this type is provided with a light source unit integrating a substantially elliptic reflector 3 fitted with a bulb 4 as a light source, a cylindrical lens holder 5 and a projection convex lens 6 together within a lamp chamber defined by a lamp body 1 and a front cover 2. Reference numeral Sa denotes a shade for forming a clear cut line of a low-beam.

The bulb 4 is structurally formed by integrating a bulb body 4*a* as a light source with a plastic bulb socket 4*b*, and a focusing ring 4*c* formed with mating pawls 4*c*1 in its peripheral edge portion is integrated with the outer periphery of the bulb socket 4*b*. On the other hand, a ring-like socket fixture 7 formed of synthetic resin is fixed with screws to the edge face of a cylindrical portion 3*b* forming a bulb fitting hole 3*a* in the reflector 3 and a mating groove 8 is formed so that the mating pawls 4*c*1 on the side of the bulb socket 4*b* can be brought into engagement with the mating groove by bayonet coupling between the bulb fitting hole 3*a* and the socket fixture 7. The bulb 4 is made detachable from the bulb fitting hole 3*a* by turning the bulb 4 (the bulb socket 4*b*).

As the conventional projection-type headlamp of this type can be made compact to the extent that a smaller reflector is usable though a large quantity of light is available in comparison with a reflection-type headlamp using a parabolic reflector, the former is increasingly spotlighted and positively utilized for automobile headlamps.

However, because the reflector 3 in the aforesaid projection-type lamp is made of metal having high thermal conductivity (generally aluminum die-cast), it suffers from a problem that high temperature resulting from the generation of heat when the bulb 4 is lighted may subject to heat deformation any part of the plastic bulb socket 4*b* or plastic socket fixture 7 which is brought into contact with the reflector 3.

SUMMARY OF THE INVENTION

In view of the foregoing problems accompanying the conventional vehicle lamp, it is an object of the present invention to provide a vehicle lamp eliminating the possibility of subjecting to thermal deformation a plastic means for fixedly holding a light source, such as a plastic bulb socket and a plastic socket fixture, in the light source fitting hole of a metal reflector.

In order to accomplish the object above, a vehicle lamp according to the present invention includes a cap-like metal reflector opening toward the front end of a lamp chamber, a light source body fixedly held in a light source fitting hole formed in the rear top portion of the reflector by plastic fixing-holding means and disposed in a predetermined position ahead of the reflector, and convection-current forming holes for restraining the reflector from being heated to high temperatures.

An air convection current is generated between the inside and outside of the reflector via the convection-current forming holes and this air convection current promotes the heat radiating action of the reflector causing warmed air inside the reflector to flow out through the convection-current forming holes and further preventing heat from accumulating inside the reflector thereby restraining the reflector from heating to high temperatures.

Furthermore, as the light receiving area of the reflector is reduced by what corresponds to the convection-current forming holes, the heat transmitted to the reflector due to the direct rays of light and the radiant heat are also reduced and the reflector is restrained from being heated up to high temperatures.

Further, according to the present invention, the vehicle lamp that are provided with the convection-current forming holes is formed on the non-effective reflective surface of the reflector.

The light distribution of the vehicle lamp is obtained from the light reflected from the effective reflective surface of the reflector, and as the light reflected from the non-effective reflective surface of the reflector hardly contributes to the light distribution of the vehicle lamp, the light distribution of the vehicle lamp remains unaffected even though the convection-current forming holes are provided in the non-effective reflective surface.

Furthermore, according to the present invention, the vehicle lamp is such that the convection-current forming holes respectively include a plurality of laterally-long slits formed at predetermined intervals in the direction of an optical axis extending in a direction substantially perpendicular to the optical axis of the reflector; and vertical wall-like heat-radiating fins extending along the respective slits are provided between the adjoining slits.

The whole open area of the convection-current forming holes is increased by forming the convection-current forming holes with a plurality of rectangular slits. The heat radiating action of the reflector is promoted by making the convection current active and besides the vertical wall-like heat-radiating fins extending along the respective slits.

According to the present invention, the vehicle lamp is such that each of the heat-radiating fins is tilted in a direction substantially perpendicular to the direction of direct rays of light from the light source body in order to have the light reflected backward.

Since the direct rays of light emitting from the light source body and passed through the convection-current forming holes are shaded by the heat-radiating fins, a wall forming the plastic lamp chamber is never irradiated with the direct rays of light. Since the direct rays of light from the light source body are reflected backward by the heat-radiating fins, moreover, the intensity of light leaking from the vehicle lamp forward is extremely low and the light distribution of the vehicle lamp remains substantially unaffected.

According to the present invention, the vehicle lamp is such that the convection-current forming holes are provided in the upper and lower portions of the reflector opposite to each other.

The air warmed in the lamp chamber is made to flow out of the reflector smoothly through the upper convection-current forming holes, whereas the air outside the reflector is made to flow into the reflector smoothly through the lower convection-current forming holes.

According to the present invention, the vehicle lamp is such that the reflector is integrated with a projection lens via a cylindrical lens holder, so that region ranging from the inside of the lens holder up to the front of the reflector is substantially closed.

The air convection current generated between the inside and outside of the reflector via the convection-current forming holes prevents heat from being accumulated inside the reflector kept substantially closed.

A vehicle lamp according to the present invention includes a cup-like metal reflector opening toward the front end of a lamp chamber and a light source body fixedly held in a light source fitting hole provided in the rear top portion of the reflector by plastic fixing-holding means and disposed in a predetermined position ahead of the reflector. Additionally, heat-radiating fins for restraining the reflector from being heated to high temperatures are provided on the outside of the reflector.

Since the outer surface area of the reflector is increased to an extent equivalent to the area of the heat-radiating fins, the heat radiating effect is improved. In other words, the heat radiating action of the reflector is promoted and the reflector is restrained from being heated to high temperatures.

According to the present invention, the vehicle lamp is such that the fixing-holding means of the light source body is a socket fixture for integrally fixing a bulb socket in the light source fitting hole, the bulb socket being a plastic bulb socket integrated with the light source body as a light emission source and/or a bulb socket integrated with the light source body as a light emission source.

As described above, the thermal deformation of the plastic bulb socket and/or the plastic socket fixture can be avoided, and the heat radiating action of the reflector is promoted by the air flow generated inside and outside of the reflector via the convection-current forming holes and direct heat and radiant heat accompanied with a reduction in the light receiving area equivalent to the area of convection-current forming holes is reduced. Moreover, according to the present invention, the heat radiating action of the reflector is promoted by the heat-radiating fins with the effect of restraining the reflector from being heated to high temperatures.

DESCRIPTION OF THE PREFERRED EMBODIMENT

A description of the preferred embodiment will now be made with reference to accompanying drawings.

Figure 1:
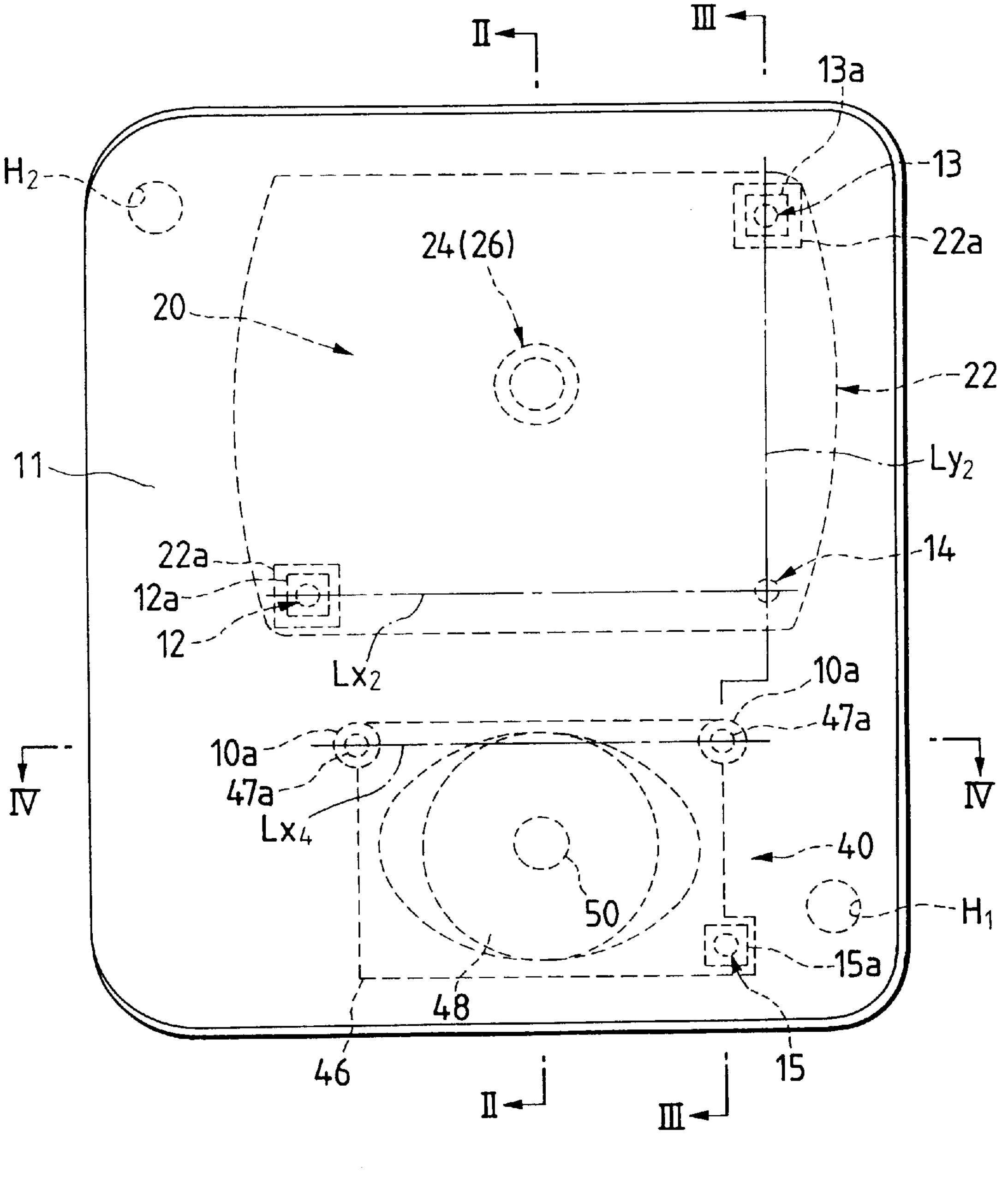
FIG. 1 is a front view of an automobile headlamp embodying the present invention.
Figure 2:
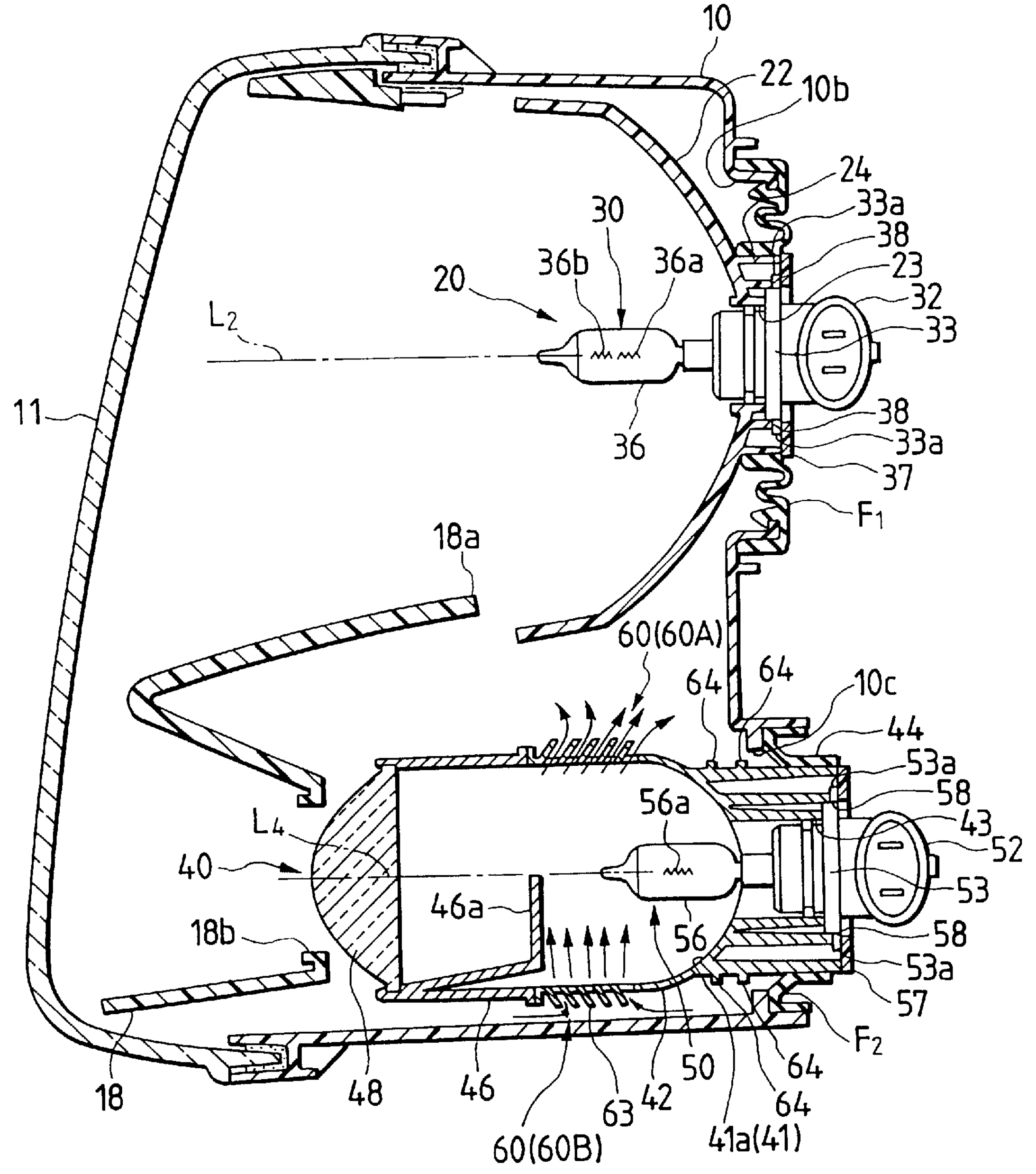
FIG. 2 is a vertical sectional view of the headlamp taken along a line II—II of FIG. 1.
Figure 3:
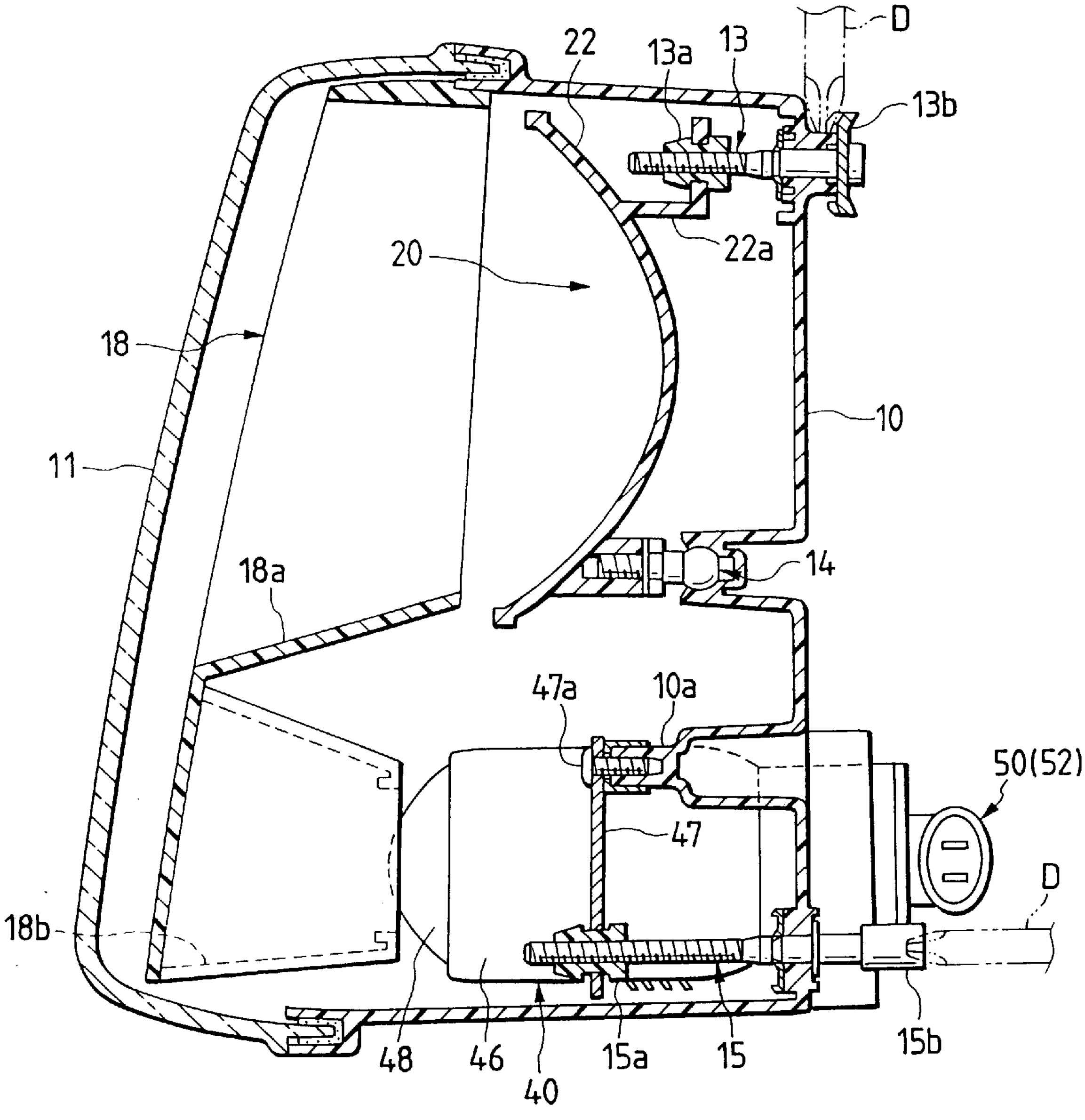
FIG. 3 is a vertical sectional view of the headlamp taken along a line III—III of FIG. 1.
Figure 4:
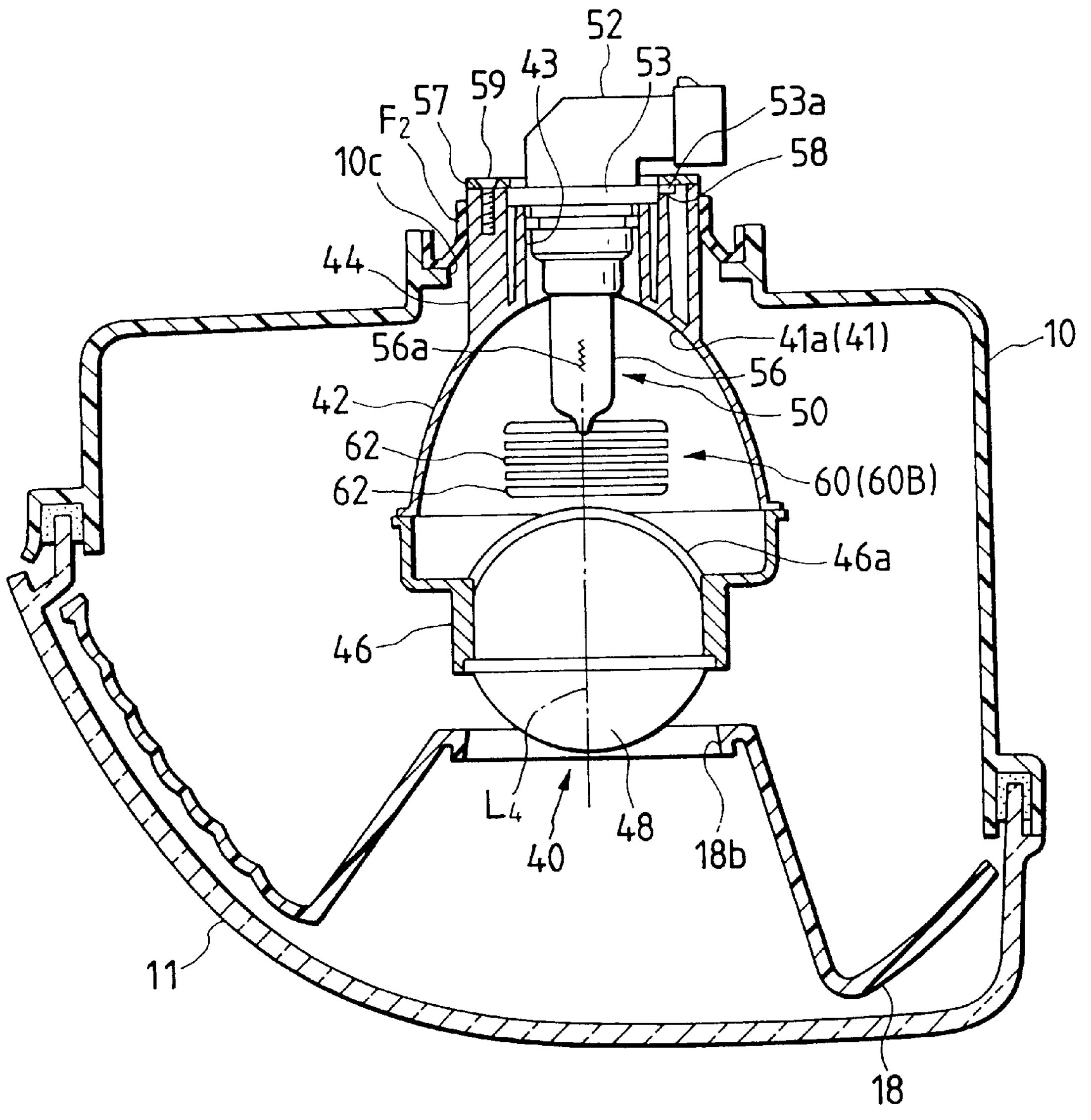
FIG. 4 is a horizontal sectional view of the headlamp taken along a line IV—IV of FIG. 1.
Figure 5:
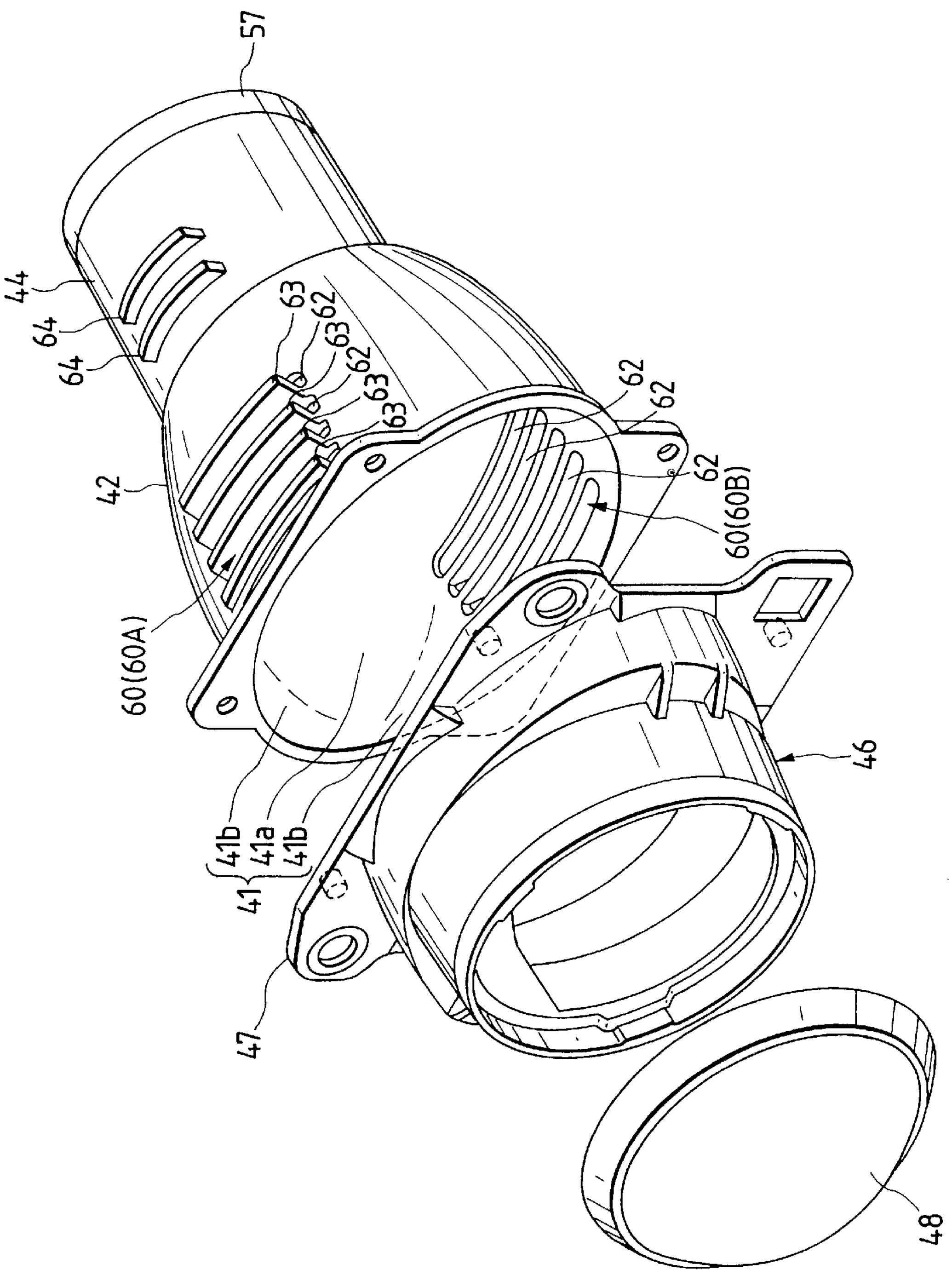
FIG. 5 is an exploded perspective view of a fog lamp unit.
Figure 6:
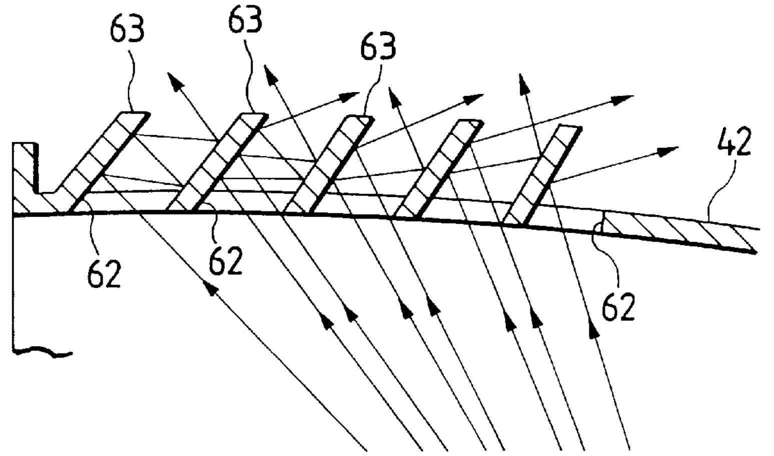
FIG. 6 is an enlarged sectional view illustrating the shading action of heat-radiating fins provided in the convection-current forming holes of a reflector in the fog lamp unit.
Figure 7:
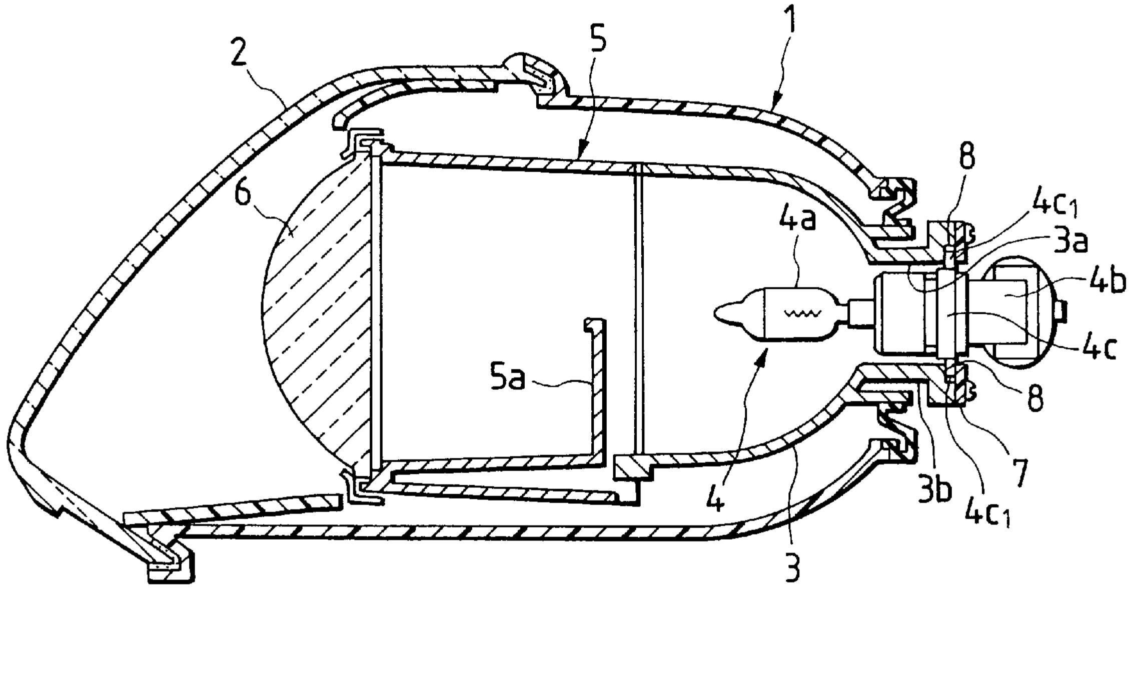
FIG. 7 (Prior Art)
FIG. 7 is a vertical sectional view a conventional automobile headlamp.

FIGS. 1 to 6 show an embodiment of the present invention. FIG. 1 is a front view of a headlamp embodying the present invention; FIG. 2 is a vertical sectional view of the headlamp (taken along a line II—II of FIG. 1); FIG. 3 is a vertical sectional view of the headlamp (taken along a line III—III of FIG. 1); FIG. 4 is a horizontal sectional view of the headlamp (taken along a line IV—IV of FIG. 1); FIG. 5 is an exploded perspective view of a fog lamp unit; and FIG. 6 is an enlarged sectional view illustrating the shading action of heat-radiating fins provided in the convection-current forming holes of a reflector in the fog lamp unit.

In these drawings, reference character 10 denotes a longitudinally-long container-like lamp body which opens from the front side toward the diagonal side and a transparent front cover 11 with its side curving backward is incorporated with the front opening of the lamp body 10, so that a lamp chamber curving from the front side toward the side. A reflection-type lamp unit 20 for forming a driving and a meeting beam and a projection-type fog lamp unit 40 are vertically provided in parallel in the lamp chamber.

Reference symbols $H_1$, $H_2$ represent air holes provided in the lamp body 10 and used for performing a breathing action by which the air warmed in the lamp chamber is made to flow out of the lamp chamber through the upper air hole $H_2$, whereas the air outside the lamp chamber is made to flow into the lamp chamber through the lower air hole $H_1$ lest condensation is produced on the front cover 11.

The lamp unit 20 includes a plastic parabolic reflector 22 subjected to an aluminum deposition process (mirror polishing) and a bulb 30 as a light source fitted and fixed in a bulb fitting hole 23 formed in the rear top portion of the reflector 22.

The bulb 30 is integral in structure with a bulb body 36 integrally containing a filament 36*a* for forming a main (high) beam and a filament 36*b* for forming a sub (low) beam, and a focussing ring 33 having three mating pawls 33*a* projecting from its peripheral edge portion is formed on the outer periphery of the bulb socket 32.

On the other hand, a ring-like socket fixture 37 formed of synthetic resin is fixed with three screws (not shown) to the edge face of a cylindrical portion 24 forming a bulb fitting hole 23 in the reflector 22 and a mating groove 38 is formed so that the mating pawls 33*a* can be brought into engagement with the mating groove by bayonet coupling between the bulb fitting hole 23 and the socket fixture 37. The bulb 30 is made detachable from the bulb fitting hole 23 by turning the bulb 30 (bulb socket 32). In this case, a flexible rubber hood $F_1$ is mounted between a bulb replacing opening 10*b* formed in the lamp body 10 and the cylindrical portion 24 of the reflector 22 in order that the rear opening 10*b* of the lamp body 10 is closed.

Then the focal point of the reflector 22 positions substantially in between filaments 36*a*, 36*b* in the bulb body 36 in such a state that the bulb 30 is fixed in the bulb fitting hole 23 (that the mating pawls 33*a* are brought into engagement with the mating groove 38 by bayonet coupling). The main beam is formed by the emission of light from the filament 36*a* for forming the main beams, whereas the sub-beam is formed by the emission of light from the filament 36*b* for forming the sub-beam.

Furthermore, the lamp unit 20 is tiltably supported with respect to the lamp body 10 by two aiming screws 12, 13 rotatably and removably supported with the rear wall of the lamp body 10 and extend; forward and one ball joint 14. More specifically, nuts 12*a*, 13*a* screwed to the respective aiming screws 12, 13 are fitted to brackets 22*a*, 22*a* projected from the rear of the reflector 22 and by making the aiming screws 12, 13 pivot, the nuts 12*a*, 13*a* move back and forth along the respective aiming screws 12, 13, whereby the lamp unit 20 is tilted around a vertical and a horizontal axis $Ly_2$, $Lx_2$ (see FIG. 1). Thereby tilting of the optical axis $L_2$ of the lamp unit 20 can be made adjustable vertically and horizontally.

Reference symbol D in FIG. 3 represents a driver for controlling the pivoting of the aiming screws, the driver being capable of controlling the pivoting of a coronary gear 13*b* installed in the read end portion of the aiming screw 13. A coronary gear (not shown) similar to the coronary gear 13*b* on the aiming screw side 13 is also installed in the rear end portion of the aiming screw 12.

A lamp unit 40 includes a substantially elliptic reflector 42 formed by aluminum die-cast and subjected to an aluminum deposition process (mirror polishing), the reflector 42 being smaller in caliber than the reflector 22 of the lamp unit 20, a bulb 50 as a light source fitted into the bulb fitting hole 43 of the reflector 42 and a projection convex lens 48 which is circular in a front view and integrated with the front opening of the reflector 42 via a cylindrical lens holder 46 die-cast in aluminum.

The bulb 50 is structurally formed by integrating a bulb body 56 containing a filament 56*a* with a plastic bulb socket 52, and a focussing ring 53 having three mating pawls 53*a* projecting from its peripheral edge portion is formed on the outer periphery of the bulb socket 52.

On the other hand, as shown in FIG. 4, a resin-made ring-like socket fixture 57 is fixed with three screws 59 to the edge face of a cylindrical portion 44 forming a bulb fitting hole 43 in the reflector 42 and a mating groove 58 is formed so that the mating pawls 53*a* can be brought into engagement with the mating groove by bayonet coupling between the bulb fitting hole 43 and the socket fixture 57. The bulb 50 is made detachable from the bulb fitting hole 43 by turning the bulb 50 (the bulb socket 52). In this case, a flexible rubber hood $F_2$ is mounted between a bulb replacing opening 10*c* formed in the lamp body 10 and the cylindrical portion 44 of the reflector 42 in order that the rear opening 10*c* of the lamp body 10 is closed.

The filament 56*a* in the bulb body 56 positions on the first focal point of the rotary elliptic effective reflective surface of the reflector 42 and a fog lamp beams is formed by the emission of light from the filament 56*a* in such a state that the bulb 50 is fixed in the bulb fitting hole 43 (that the mating pawls 53*a* are brought into engagement with the mating groove 58 by bayonet coupling). In other words, reference numeral 46*a* denotes a shade for forming a cut off line, which is uprightly provided in the focal position of the projection convex lens 48 in a position near the second focal point of the rotary elliptic effective reflective surface of the reflector 42. Part of the light reflected from the reflector 42 and directed to the projection convex lens 48 is blocked off by the shade 46*a*, so that a predetermined light distribution pattern having a clear cut off line following the upper edge configuration of the shade 46*a* is formed.

Furthermore, the lamp unit 40 is tiltably supported in only the vertical direction with respect to the lamp body 10 by one aiming screw 15 rotatably and removably supported with the rear wall of the lamp body 10 and extending forward. More specifically, lateral upper side edge corner portions of an outwardly-directed flange 47 (see FIGS. 3 and 5) provided to the lens holder 46 are fixed with screws 47*a* to the respective bosses 10*a* (see FIG. 3) projecting from the lamp body 10 and a nut 15*a* screwed into the aiming screw 15 is fitted to the right lower edge corner portion of the outwardly-directed flange 47. Consequently, the nut 15*a* moves back and forth along the aiming screw 15 by making the aiming screw 15 pivot, whereby the lamp unit 40 is tilted around the horizontal axis $Lx_4$ (see FIG. 1). Thereby tilting the optical axis $L_4$ of the lamp unit 40 which is adjustable only vertically. Incidentally, a mating portion 15*b* with which a driver D can be brought into engagement is provided in the rear end portion of the aiming screw 15 and the mating portion 15*b* is caused to pivot by the use of the driver D.

Reference numeral 18 denotes an extension reflector in which circular openings 18*a*, 18*b* are formed each corresponding to the reflector 22 of the lamp unit 20 and the projection convex lens 48 of the lamp unit 40, and which is provided from the front opening of the lamp body 10 along the inner part of the front cover 11. The surface of the extension reflector 18 is subjected to an aluminum deposition process (mirror polishing) like the reflectors 22, 42 and acts not only conceals the peripheral regions of the reflectors 22, 42 but also makes the whole inner part of the lamp chamber look like a single specular color, with the effect of giving the headlamp an excellent appearance.

Reference numeral 60 (60A, 60B) denotes convection-current forming holes formed in the upper and lower side walls of the reflector 42 and a convection current is generated between the inside and outside of the reflector 42 via the convection-current forming holes 60 (60A, 60B) as shown by arrows of FIG. 2.

More specifically, the bulb 50 itself is caused to be heated to high temperatures when lighted and thermal energy originating from the heat radiated from the bulb 50 or the direct rays of light is transmitted to the plastic bulb socket 52 and the plastic socket fixture 57 via the reflector 42 die-cast in aluminum having high thermal conductivity. As the reflector 42 is kept in a substantially airtight condition by the cylindrical lens holder 46 and the projection convex lens 48, the inside thereof in particular is filled with heated air and intense heat is transmitted to the bulb socket 42 and the socket fixture 57, which may subject the bulb socket 52 and the socket fixture 52 to thermal deformation.

Therefore, the convection-current forming holes 60 (60A, 60B) are formed in the upper and lower side walls holding the bulb body 56 of the reflector 42 therebetween according to the present embodiment of the invention. Accordingly, there develops an air convection current in which the warmed air inside the reflector 42 flows out of the reflector 42 through the upper convention-current forming holes 60A, whereas the air outside the reflector 42 flows into the reflector 42 through the lower convection-current forming holes 60B. Due to the air convection current thus formed between the inside and outside of the reflector 42 via the convection-current forming holes 60 (60A, 60B), the heat radiating action of the reflector 42 is promoted and the air between the inside and outside of the reflector 42 is stirred, whereby the reflector 42 is restrained from being heated up because the airtight space inside the reflector 42 is set free from heat accumulation.

As the light receiving area of the reflector 42 is reduced by what corresponds to the convection-current forming holes 60 (60A, 60B), the thermal energy transmitted to the reflector 42 due to the direct rays of light and the radiated heat energy of the bulb 50 are also reduced and the reflector 42 is restrained from being heated up to that extent.

The reflective surface 41 subjected to the aluminum deposition treatment on the inside of the reflector 42 includes a substantially elliptic effective reflective surface 41*a* which is formed in a region ranging from the periphery of the bulb fitting hole 43 to the inner lateral sides and contributes to the light distribution of the lamp, and a non-effective reflective surface 41*b* which is formed in a region up to an inner vertical side close to the opening of the reflector 42 and which hardly contributes to the light distribution of the lamp (see FIG. 5). Since the convection-current forming holes 60 (60A, 60B) are formed in the non-effective reflective surface 41*b*, substantially the same quantity of light as that of the fog lamp unit using the reflector without having the convection-current forming holes 60 (60A, 60B) is secured.

Furthermore, the convection-current forming holes 60 (60A, 60B) are formed with a number of rectangular slits 62 formed longitudinally at predetermined intervals and the whole open area is large enough to make greater the flow rate of an air convection current formed between the inside and outside of the reflector 42 and also make greater the quantity of heat radiating from the reflector 42 as well as the quantity of stirred air, so that the reflector 42 hardly becomes heated to high temperatures.

Moreover, vertical wall-like heat-radiating fins 63 are longitudinally provided in between the slits 62 and air flow from the slits 62 takes off heat on the surface and undersurface of each heat-radiating fin 63 when the air flows along the heat-radiating fins 63. Thus, the heat-radiating action of the reflector 42 is increased.

Heat-radiating fins 64 are also provided on the outer peripheral face of the cylindrical portion 44 where the bulb fitting holes 43 are formed and consequently the heat-radiating action of the reflector 42 is increased likewise.

As the heat-radiating fins 63 are tilted from the filament 56*a* in a direction substantially perpendicular to the direct rays of light to ensure that the direct rays of light are shaded by the heat-radiating fins, the direct rays of light are never allowed to directly pass through the slits. Therefore, it is possible to obviate nonconformity arising from bringing the extension reflector 18, the reflector 22 of the lamp unit 20 and the lamp body 10 into direct contact with the direct rays of light.

Although the light reflected from the heat-radiating fins 63 is, as shown in FIG. 6, directed to the rear and front of the reflector 42, the intensity of light reflected from the heat-radiating fins 63 is low because the outer surface of the reflector 42 including the heat-radiating fins 63 are subjected to oxidation and turned black. Since the intensity of light reflected from the lamp body 10, the extension reflector 18 and the reflector 22 is weakened further, the light is extremely weak in intensity even though there exists the light passed through the front cover 11 and directed forward and the light distribution of the lamp entirely remains unaffected.

Although the metal reflector 42 is provided with the convection-current forming holes 60 (60A, 60B) and the heat-radiating fins 63, 64 according to the aforesaid embodiment of the invention, the metal reflector 42 may be arranged so that it is provided with only heat-radiating fins without forming convection-current forming holes in order to restrain such a reflector from being heated to high temperatures.

A description has been given of a structure wherein the substantially elliptic reflector 42 of the projection-type lamp unit 40 kept substantially airtight inside is provided with the convection-current forming holes 60 (60A, 60B) according to the aforesaid embodiment of the invention. In a case where the reflector 22 in the reflection-type lamp unit 20 is made of metal, however, the provision of convection-current forming holes for the metal reflector (i.e., its non-effective reflective surface) makes the present invention also applicable to any lamp of the reflection-type.

A description has been given of an automobile fog lamp according to the aforesaid embodiment of the invention. However, the present invention is not limited to the fog lamp but may be widely applicable to headlamps and other vehicle lamps as long as the lamp is equipped with a metal reflector.

Although the bulb socket 52 as a means for fixedly holding a light source body and the socket fixture 56 are made of synthetic resin according to the aforesaid embodiment of the invention, the present invention is needless to say applicable to the case of a plastic bulb socket with a metal socket fixture or of a plastic socket fixture with a metal bulb socket whereby to avoid the thermal deformation of the plastic bulb socket or the plastic socket fixture.

As is obvious from the description given above, according to the present invention, the reflector, though extremely simple in structure, is restrained from being heated to high temperatures when the vehicle lamp is lighted by providing the reflector with the convection-current forming holes. There is no possibility that the plastic light-source fixing-holding means is subjected to thermal deformation to ensure that the durability of the plastic light-source fixing-holding means is extended over a long period of time.

Further, the provision of the convection-current forming holes in the non-effective reflective surface hardly contributing to the light distribution of the vehicle lamp makes available substantially the same light distribution as the light distribution of the vehicle lamp without having the convection-current forming holes.

Furthermore, as the whole open area of the convection-current forming holes is large, the active convection current together with the heat radiating action of the vertical wall-like heat-radiating fins ensures that the reflector is restrained from being heated to high temperatures when the vehicle lamp is lighted.

According to the present invention, moreover, as the direct rays of light are not emitted from the convection-current forming holes, there is no possibility that the vertical wall-like heat-radiating fins are subjected to thermal deformation and that the disturbance of the light distribution of the vehicle lamp as well as the generation of glare light occur.

According to the present invention, the air convection current is directed from the upper side to lower side around the light source body of the reflector via the convection-current forming holes, which results in stirring the air inside and outside of the reflector efficiently, thus restraining the reflector from being heated to high temperatures.

According to the present invention, the inside of the substantially airtightly closed reflector in the projection type lamp unit is stirred by the air convention current produced between the inside and outside of the reflector via the convection-current forming holes with the effect of restraining the reflector from being heated to high temperatures.

According to the present invention, the reflector though extremely simple in structure is restrained from being heated to high temperatures when the vehicle lamp is lighted by providing the heat-radiating fins on the outside of the reflector and as there is no possibility that the plastic light-source fixing-holding means is subjected to thermal deformation to ensure that the durability of the plastic light-source fixing-holding means is extended over a long period of time.

According to the present invention, the reflector is restrained from being heated to high temperatures and besides the plastic socket fixture for fixing the plastic bulb socket and/or the bulb socket as the light-source fixing-holding means is never subjected to thermal deformation.

What is claimed is:

1. A vehicle lamp comprising:

a cup-like metal reflector opening toward a front end of a lamp chamber, said reflector comprising a light source fitting hole formed in a rear portion thereof;

a covering over the reflector opening toward the front end of the lamp chamber, comprising a light-transmitting portion;

a fixing-holder member coupled to said light source fitting hole of said reflector;

a light source body held in said fixing holding member and disposed in a predetermined position ahead of the rear portion of said reflector; and at least two convection-current forming holes formed on a surface of said reflector;

wherein airflow into and out of said vehicle lamp is substantially through said convection-current forming holes, and wherein said convection-current forming holes respectively comprise a plurality of laterally-long slits formed at predetermined intervals in the direction of an optical axis extending in a direction substantially perpendicular to the optical axis of the reflector, and further comprises vertical wall-like heat-radiating fins extending along the respective slits and disposed between said adjoining slits.

2. A vehicle lamp as claimed in claim 1, wherein the convection-current forming holes are formed in a non-effective reflective surface of said reflector.

3. A vehicle lamp as claimed in claim 1, wherein each of said heat-radiating fins is tilted in a direction substantially perpendicular to the direction of direct rays of light from the light source body.

4. A vehicle lamp as claimed in claim 1, wherein said convection-current forming holes are formed on upper and lower surface portions of said reflector opposite to each other.

5. A vehicle lamp as claimed in claim 1, wherein said covering further comprises a cylindrical lens holder, and wherein said light-transmitting portion comprises a projection lens, wherein said reflector is formed integrally with said projection lens via said cylindrical lens holder.

6. A vehicle lamp as claimed in claim 1, wherein said fixing-holding member is a socket fixture, wherein said socket fixture fixes a bulb socket, which is formed integrally with the light source body, to said light source fitting hole.

7. A vehicle lamp as claimed in claim 6, wherein said socket fixture is formed of synthetic resin.

8. A vehicle lamp as claimed in claim 6, wherein said bulb socket is formed of synthetic resin.

9. A vehicle lamp as claimed in claim 1, wherein said fixing-holding member is a socket fixture formed of synthetic resin.

10. A vehicle lamp as claimed in claim 1, wherein said fixing-holding member is a bulb socket formed of synthetic resin which is formed integrally with the light source body.

* * * * *